US009969010B2

(12) United States Patent
Chartier et al.

(10) Patent No.: US 9,969,010 B2
(45) Date of Patent: May 15, 2018

(54) HOLE SAW DRILL GUIDE

(71) Applicant: Ridge Tool Company, Elyria, OH (US)

(72) Inventors: Glen R. Chartier, Avon Lake, OH (US); James Tunningley, Lakewood, OH (US); Harald Krondorfer, Aurora, OH (US); Jörg Rosenthal, Reichshof-Eckenhagen (DE)

(73) Assignee: Ridge Tool Company, Elyria, OH (US)

( * ) Notice: Subject to any disclaimer, the term of this patent is extended or adjusted under 35 U.S.C. 154(b) by 65 days.

(21) Appl. No.: 14/874,780

(22) Filed: Oct. 5, 2015

(65) Prior Publication Data
US 2016/0256936 A1 Sep. 8, 2016

Related U.S. Application Data

(60) Provisional application No. 62/129,334, filed on Mar. 6, 2015.

(51) Int. Cl.
*B23B 47/28* (2006.01)
*B25H 1/00* (2006.01)

(52) U.S. Cl.
CPC ......... *B23B 47/281* (2013.01); *B25H 1/0064* (2013.01); *B23B 2215/72* (2013.01); *B23B 2247/12* (2013.01); *B23B 2247/18* (2013.01); *B23B 2270/30* (2013.01); *B23B 2270/62* (2013.01); *Y10T 408/50* (2015.01); *Y10T 408/5619* (2015.01); *Y10T 408/56245* (2015.01); *Y10T 408/895* (2015.01)

(58) Field of Classification Search
CPC .............. B23B 47/281; B23B 2247/12; B23B 2247/18; Y10T 408/5619; Y10T 408/56245
See application file for complete search history.

(56) References Cited

U.S. PATENT DOCUMENTS

| 2,622,458 | A |   | 12/1952 | Jenkins |                      |
|-----------|---|---|---------|---------|----------------------|
| 3,465,620 | A | * | 9/1969  | Hilburn | B23B 47/287 144/93.1 |
| 3,711,214 | A | * | 1/1973  | Cloutier | B23B 5/162 29/560   |
| 3,976,091 | A | * | 8/1976  | Hutton  | B23B 51/044 137/318  |
| 4,152,090 | A | * | 5/1979  | Harris  | B23B 47/281 408/104  |

(Continued)

FOREIGN PATENT DOCUMENTS

| DE | 3741644      |   | 6/1989 |             |
|----|--------------|---|--------|-------------|
| DE | 4227975 A1   | * | 3/1993 | ...... B23B 47/287 |

OTHER PUBLICATIONS

International Search Report (ISR) and Written Opinion; PCT/US15/53942; dated Dec. 17, 2015 (9 Pages).

(Continued)

*Primary Examiner* — Eric A Gates
(74) *Attorney, Agent, or Firm* — Mark E. Bandy; Rankin, Hill & Clark LLP

(57) ABSTRACT

A hole saw drill guide is described. The drill guide can be used when drilling holes in pipe or tubes. The hole saw drill guide includes a guide tube base assembly and an arbor shaft assembly. The guide tube base assembly is chained or otherwise secured to a pipe. The arbor shaft assembly is removably engaged with the guide tube base assembly and during use of the device, rotates within a guide tube of the base.

21 Claims, 9 Drawing Sheets

(56) References Cited

U.S. PATENT DOCUMENTS

| | | | |
|---|---|---|---|
| 4,375,341 A * | 3/1983 | Schulze | B23B 47/28 |
| | | | 408/111 |
| 4,936,720 A | 6/1990 | Dolatowski et al. | |
| 5,051,044 A * | 9/1991 | Allen | B25H 1/0064 |
| | | | 33/371 |
| 5,800,099 A | 9/1998 | Cooper | |
| 5,893,686 A * | 4/1999 | Weiler | F16L 41/06 |
| | | | 137/315.42 |
| 6,050,753 A * | 4/2000 | Turner | B25H 1/0064 |
| | | | 408/712 |
| 6,126,369 A * | 10/2000 | Jiles | F16L 41/04 |
| | | | 137/318 |
| 6,264,406 B1 * | 7/2001 | Bowles | B23Q 9/02 |
| | | | 269/131 |
| 6,619,893 B2 * | 9/2003 | Frick | F16L 41/06 |
| | | | 137/318 |
| 6,761,511 B2 * | 7/2004 | Turner | B23B 47/281 |
| | | | 137/318 |
| 7,179,028 B2 * | 2/2007 | Linderholm | B23B 49/026 |
| | | | 408/97 |
| 7,360,973 B2 | 4/2008 | Turner | |
| 7,435,041 B1 | 10/2008 | McGill | |
| 7,611,314 B2 * | 11/2009 | Lipczynski | B23B 49/023 |
| | | | 279/43.4 |
| 7,980,793 B2 * | 7/2011 | Mathis | B23Q 3/002 |
| | | | 408/1 R |
| 8,622,664 B2 * | 1/2014 | Lanser | B25H 1/0021 |
| | | | 408/92 |

OTHER PUBLICATIONS

Reed Tool HCB-200 Hole Master; www.reedmfgco.com; RP-1010-106 (1 page).

* cited by examiner

HOLE SAW DRILL GUIDE

This application claims priority upon U.S. provisional application Ser. No. 62/129,334 filed Mar. 6, 2015.

FIELD

The present subject matter relates to a hole saw drill guide and arbor shaft assembly. The assembly can be used with a powered drill for creating accurately sized and positioned holes in pipe and tubing.

BACKGROUND

Numerous applications exist that require forming openings in pipe walls, for example when installing interconnecting conduits or liquid flow lines, and particularly to existing pipe runs. Hole saws are known in the art which are typically attached to a powered drill. However, it is very difficult to accurately position or create an opening in a pipe wall using a hole saw due to the circumferential shape of the pipe and problems in maintaining a desired orientation between the drill and the pipe during hole formation. Although various jigs, mounting assemblies, and tools having been proposed in the past, a need remains for a device that enables formation of holes in pipes in an accurate, reliable, and easy to use fashion.

SUMMARY

The difficulties and drawbacks associated with previous approaches are addressed in the present subject matter as follows.

Generally, the present subject matter provides a hole saw drill guide comprising a guide tube base assembly and an arbor shaft assembly. The guide tube base assembly includes a guide tube defining a hollow interior and a slot extending along at least a portion of the length of the guide tube. The arbor shaft assembly includes a central shaft, an outer housing, a plurality of bearings for rotatably supporting the central shaft within the outer housing, and an outwardly projecting guide pin engaged with the outer housing. The arbor shaft assembly is sized to be insertably received within the hollow interior of the guide tube and upon positioning the guide pin of the arbor shaft assembly within the slot defined by the guide tube, the central shaft of the arbor shaft assembly is rotatably supported within the guide tube of the guide tube base assembly.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides various tools and devices for use in forming holes, apertures, or performing other operations upon a workpiece and particularly upon a circumferential surface of a pipe. The tools are generally referred to herein as hole saw drill guides and are used with a source of rotary power such as for example an electrically powered drill. The hole saw drill guides comprise a guide tube assembly and an arbor shaft assembly. The components are sized and configured such that the arbor shaft assembly can be inserted in and slidably coupled with the guide tube assembly as described herein. Typically, the guide tube assembly is secured to a workpiece such as a pipe, and at a location at which a hole or opening is to be formed. The arbor shaft assembly including a hole saw is engaged with a drill or other power source, and then inserted in the secured guide tube assembly. Powered rotation of the arbor shaft and hole saw can then be performed while the orientation of the arbor shaft and hole saw is maintained by the guide tube base assembly.

Figure 1:
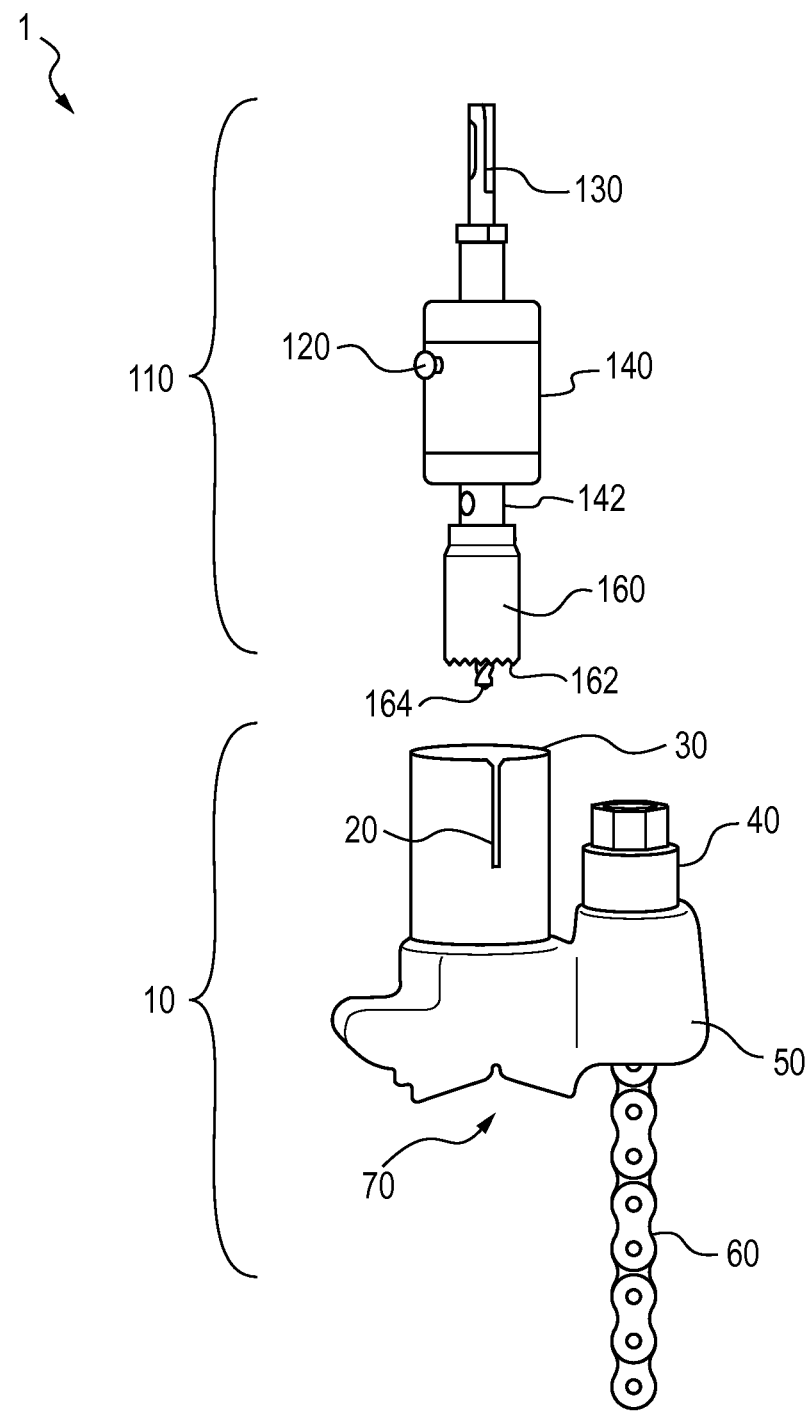
FIG. 1 is a schematic assembly view illustrating an embodiment of a hole saw drill guide in accordance with the present subject matter.

FIG. 1 illustrates a hole saw drill guide 1 in accordance with the present subject matter. The hole saw drill guide 1 comprises a guide tube base assembly 10 and an arbor shaft assembly 110. The guide tube base assembly 10 includes a guide tube 30 defining a guide tube slot 20, chain adjustment provisions 40 or other adjusting means, a mounting base 50, and a chain 60. The mounting base 50 defines an underside 70 having a V-shaped configuration. The arbor shaft assembly 110 includes an anti-rotation guide pin 120, a power drill connection 130, a bearing carriage 140, a central shaft 142, and a hole saw 160. As will be appreciated, the hole saw 160 includes a plurality of teeth 162 and a pilot or centering drill 164. Each of these components and others, their functions and operations are all described in greater detail herein.

Figure 2:
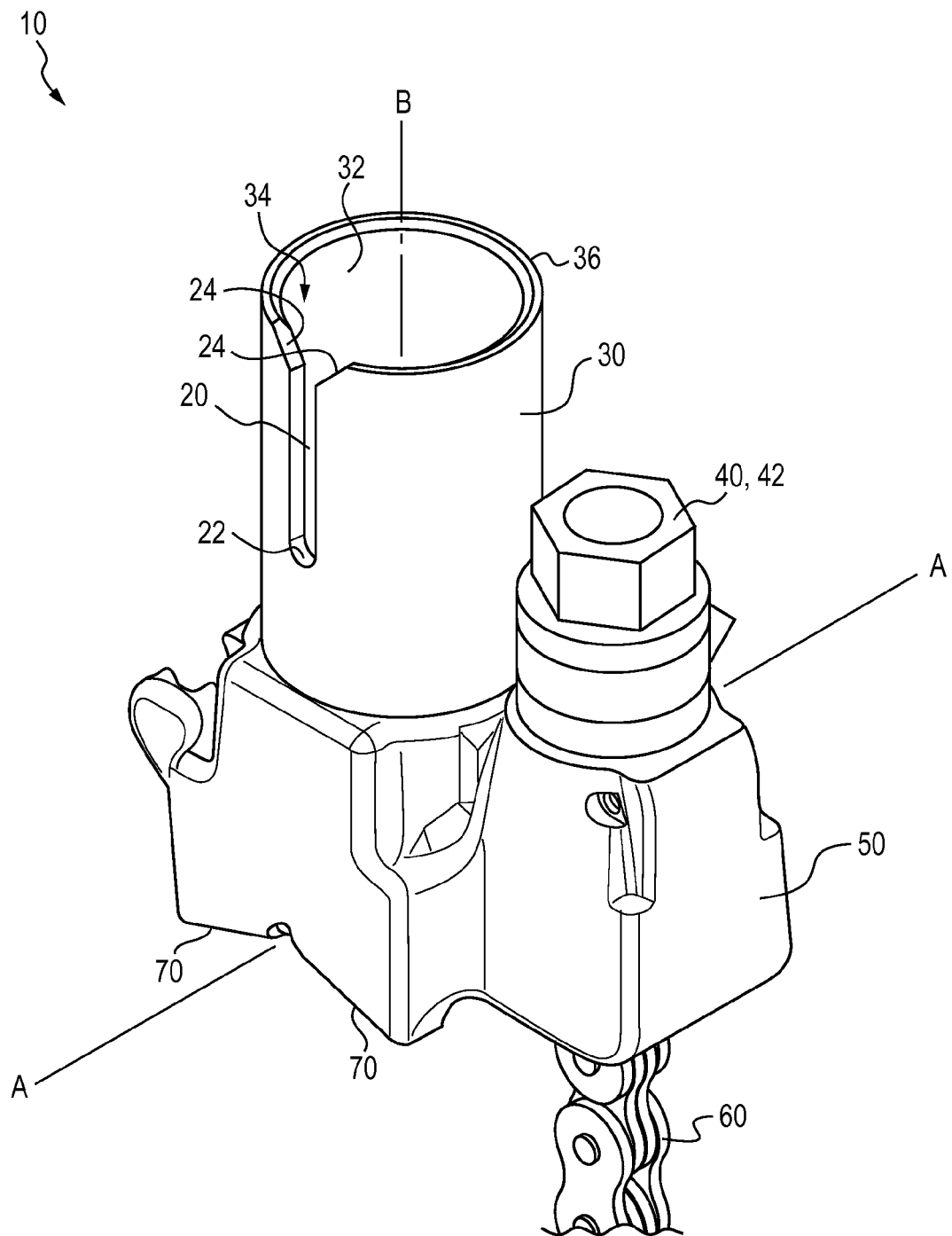
FIG. 2 is a schematic perspective view of a guide tube base assembly of the hole saw drill guide of FIG. 1.

FIG. 2 is a perspective view of the guide tube base assembly 10 depicted in FIG. 1. The base assembly 10 includes the previously noted mounting base 50 having an underside 70 which has a V-shaped configuration. During use of the hole saw drill guide, the mounting base 50 is positioned on a pipe (not shown) in which a hole or aperture is to be formed for example. Typically, the hole is created along an axis perpendicular to the longitudinal axis of the pipe. The underside 70 of the mounting base 50 contacts the circumferential outer surface of the pipe. The mounting base 50 is positioned on the pipe (not shown) such that axis A of the V-shaped configuration is aligned with a longitudinal axis of the pipe. This ensures at least two linear regions of contact between the pipe outer surface and the underside 70 of the mounting base 50. In many embodiments, the V-shaped configuration is sized to accommodate pipes having a diameter of from about 1.5 inches to about 6 inches. However, it will be appreciated that the present subject matter includes mounting bases sized and/or configured for use with pipes having diameters outside of this range. The V-shaped configuration of the underside 70 of the mounting base promotes quick and convenient centering of the hole saw drill guide on a pipe as described in greater detail herein.

The mounting base 50 has a generally hollow interior and includes a guide tube 30 extending from the base 50 and typically in a direction generally opposite the underside 70 of the base 50. The guide tube 30 is typically cylindrical and includes a circumferential inner surface 32 defining a hollow interior 34. Although the guide tube is typically cylindrical, the present subject matter includes the use of other shapes and configurations for the guide tube. The guide tube 30 also defines a guide tube slot 20 extending from a distal edge 36 of the guide tube 30 toward the mounting base 50. The slot 20 is typically linear, and parallel with a longitudinal axis of the guide tube 30 shown as axis B in FIG. 2. The slot 20 extends between an endwall 22 and the distal edge 36 of the guide tube 30. The slot typically extends along at least a portion of the length of the guide tube. One or more slot shoulders 24 may be provided to transition between the distal edge 36 and the slot 20 for easier insertion of the guide pin 120. Typically, the guide tube 30 is fixed to and stationary relative to the base 50. In many embodiments, the longitudinal axis B of the guide tube 30 is perpendicular to the axis A defined by the V-shaped configuration of the underside 70 of the mounting base 50. However, it will be understood that the present subject matter includes other embodiments in which the axis B is not transversely oriented to axis A.

The mounting base 50 also includes chain adjustment provisions 40 which for example can be in the form of an adjustment nut 42. As described in greater detail herein, the chain adjustment provisions function to selectively adjust the length of the chain 60 which is affixed to the provisions 40 and/or the base 50. As will be understood, rotation of the adjustment nut 42 results in linear displacement of the chain 60, i.e., either lengthening or shortening the effective length of the chain.

Figure 3:
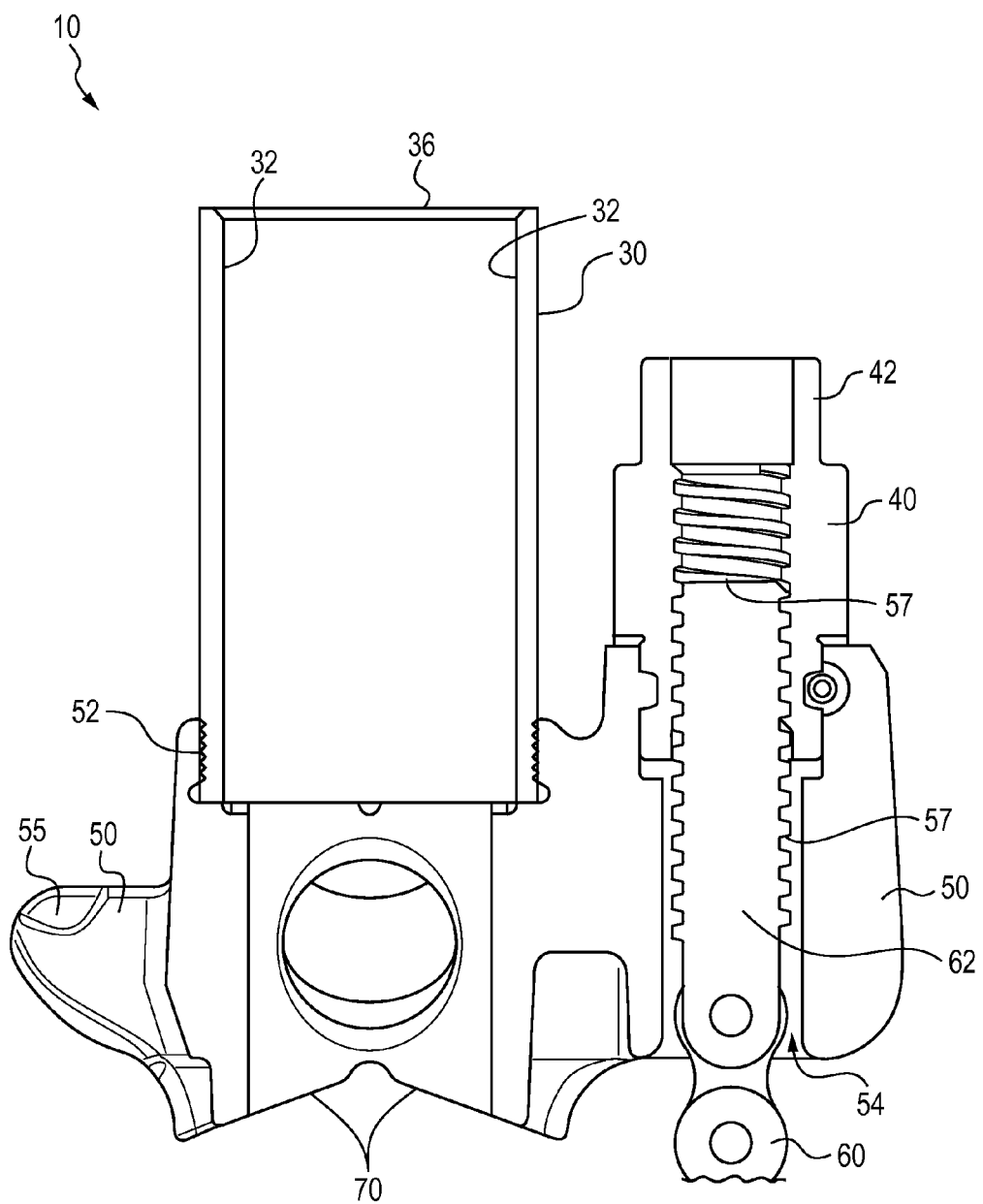
FIG. 3 is a schematic cross section of the guide tube base assembly.

FIG. 3 is a cross sectional view of the guide tube base assembly 10 and its components. In the particular version shown, the guide tube 30 is threadedly engaged with a threaded receiving region 52 defined in the base 50. However, it will be appreciated that the present subject matter includes a variety of means for engaging together the guide tube 30 and the mounting base 50. In certain embodiments, it is contemplated that the guide tube 30 and the mounting base 50 are integrally formed with one another. It is also contemplated that an interference fit could be utilized between the guide tube 30 and the mounting base 50.

FIG. 3 illustrates in greater detail the chain adjustment provisions 40. In this version of the hole saw drill guide 1, the mounting base 50 defines a chain receiving passage 54 which is sized to accommodate the chain 60 and a threaded chain engagement member 62 affixed to the chain 60 and specifically to a distal or endmost chain link or chain member. The chain adjustment provisions 40 also comprise a rotatable nut 42 rotatably secured within the base 50. The nut 42 is threadedly engaged with thread(s) 57 of the chain engagement member 62 such that rotation of the nut 42 results in linear displacement or movement of the member 62. As will be appreciated, upon positioning the base 50 upon a pipe, the chain 60 is looped around or at least partially about the pipe and pulled to remove excess slack. An opposite end of the chain 60 (not shown) is affixed to the base 50, and the chain adjustment provisions 40 operated to thereby tighten the chain 60 around the pipe and thereby secure the base 50 to the pipe. In many embodiments, the end of the chain can be affixed to the base 50 by positioning a chain pin into a cradle 55 provided in the base 50.

Figure 3A:
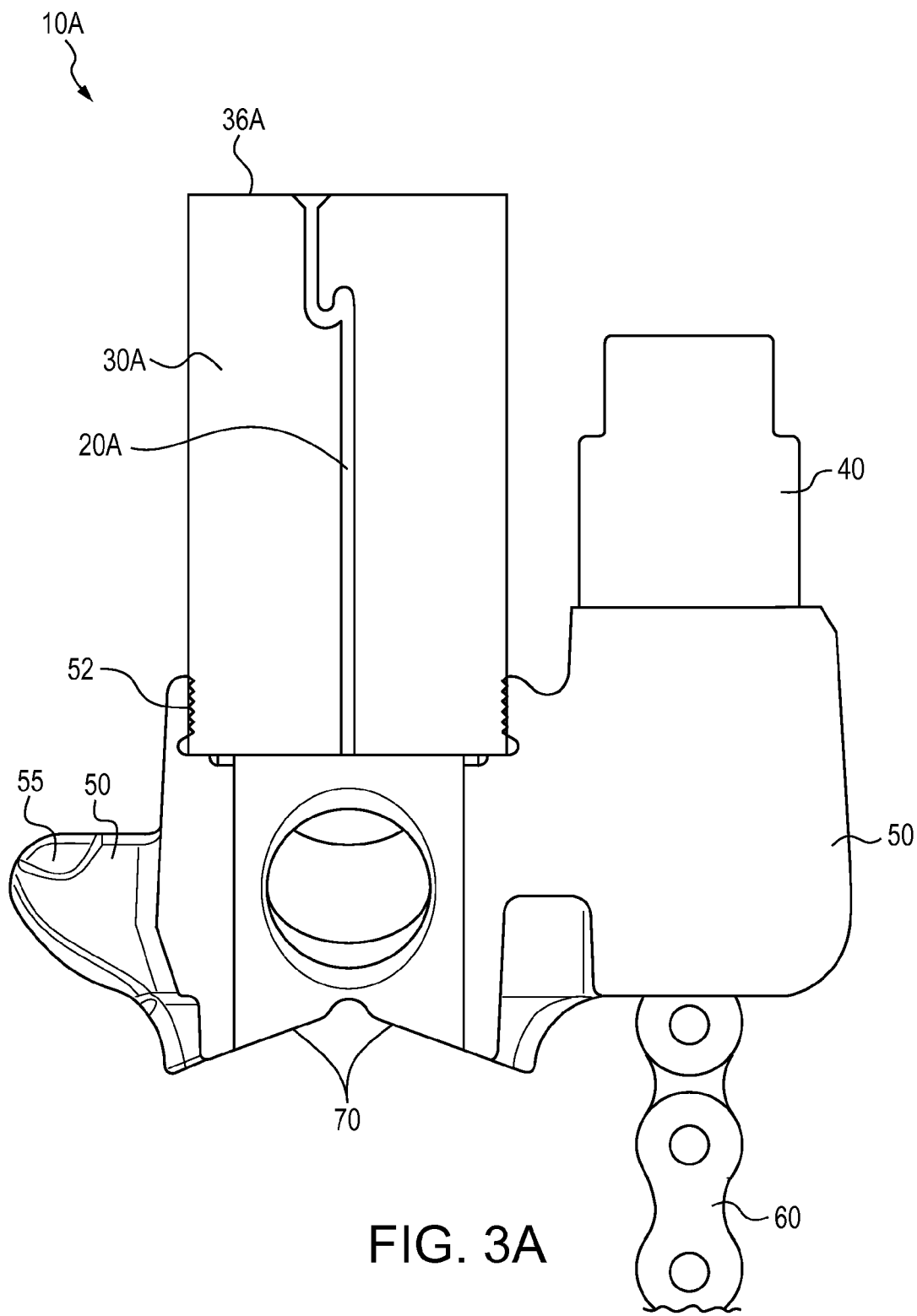
FIG. 3A is a schematic view of another embodiment of a guide tube base assembly.

FIG. 3A is a schematic illustration of another embodiment of a guide tube assembly 10A in accordance with the present subject matter. The guide tube assembly 10A includes a variant guide tube 30A having an S-shaped slot 20A as shown. The S-shaped slot 20A can extend partially along the length of the guide tube 30A or can extend entirely along the length as shown such as from a distal edge 36A to the threaded receiving region 52 of the base 50. The S-shaped slot 20A serves to retain the arbor shaft assembly in various orientations of the guide tube assembly such as when the guide tube assembly is secured to a pipe in an "upside down" orientation. It will be understood that the present subject matter includes a variety of alternate configurations and component variations. For example, as previously noted, the guide tube 30, 30A could be formed in other shapes besides a cylindrical shape. For example, the guide tube could be formed to have a cross section that was square-shaped, rectangular, triangular, or be polygonal, so long as appropriate modifications were made to the arbor shaft assembly.

Figure 4:
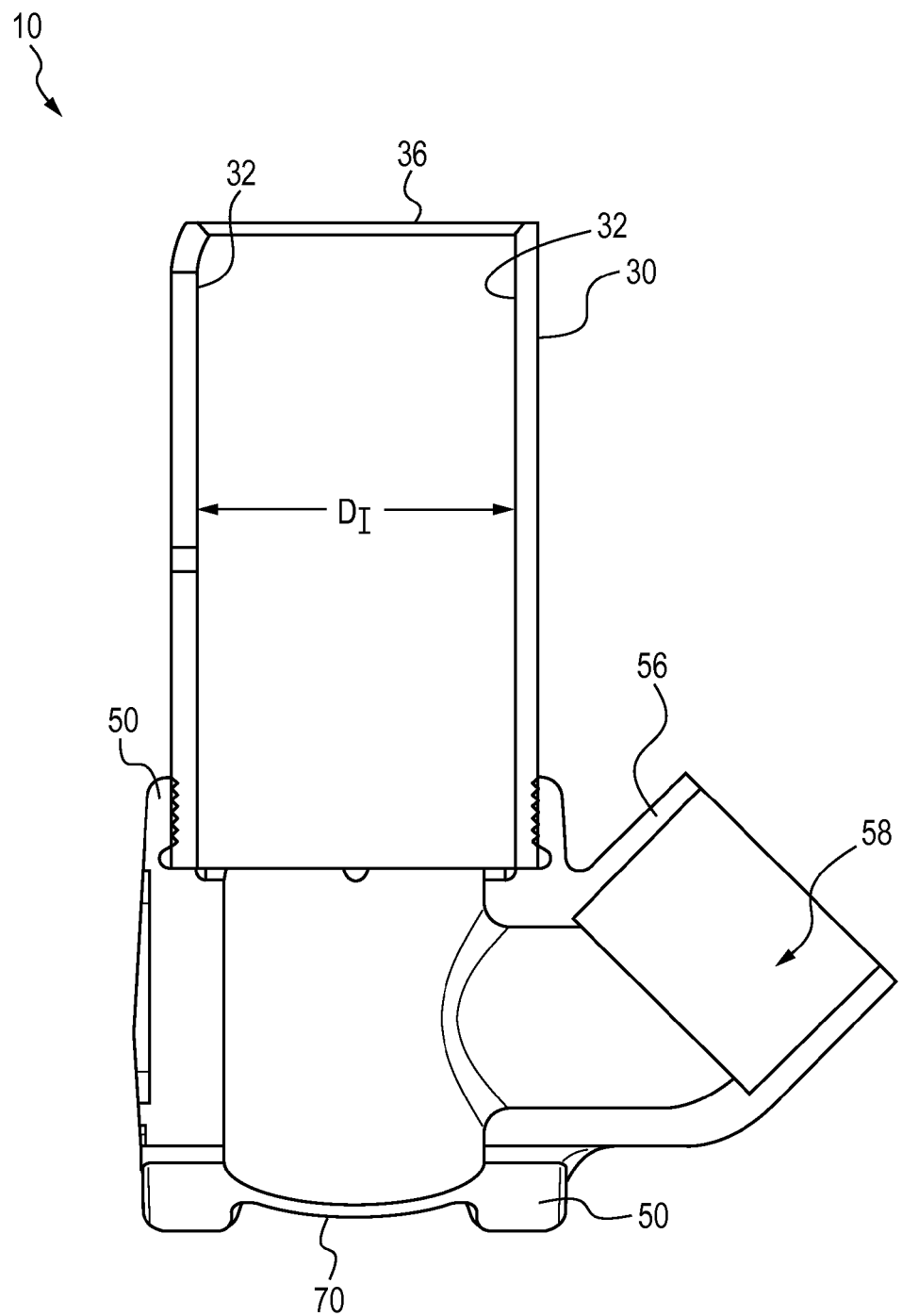
FIG. 4 is another schematic cross section of portions of the guide tube base assembly.

FIG. 4 is another cross sectional view of the guide tube base assembly 10 and its components. A vacuum port 56 is provided which generally extends laterally outward from the base 50. The vacuum port 56 defines a hollow passage 58 which provides flow communication with the generally hollow interior of the mounting base 50. The vacuum port 56 provides for convenient attachment for a vacuum hose or other source of reduced pressure to facilitate collection of drilling dust and debris such as metal chips during or after formation of a hole in a pipe or other workpiece operation. The vacuum port can be integrally formed as part of the mounting base 50. However, it is also contemplated that the port 56 could be a separate component which is attached to the base so long as the port is placed in flow communication with the hollow interior of the base 50. In particular embodiments, the side walls of the base are configured to reduce or "close" the gap to the pipe in order to improve airflow around the hole saw for increased cooling and chip or debris removal.

Figure 5:
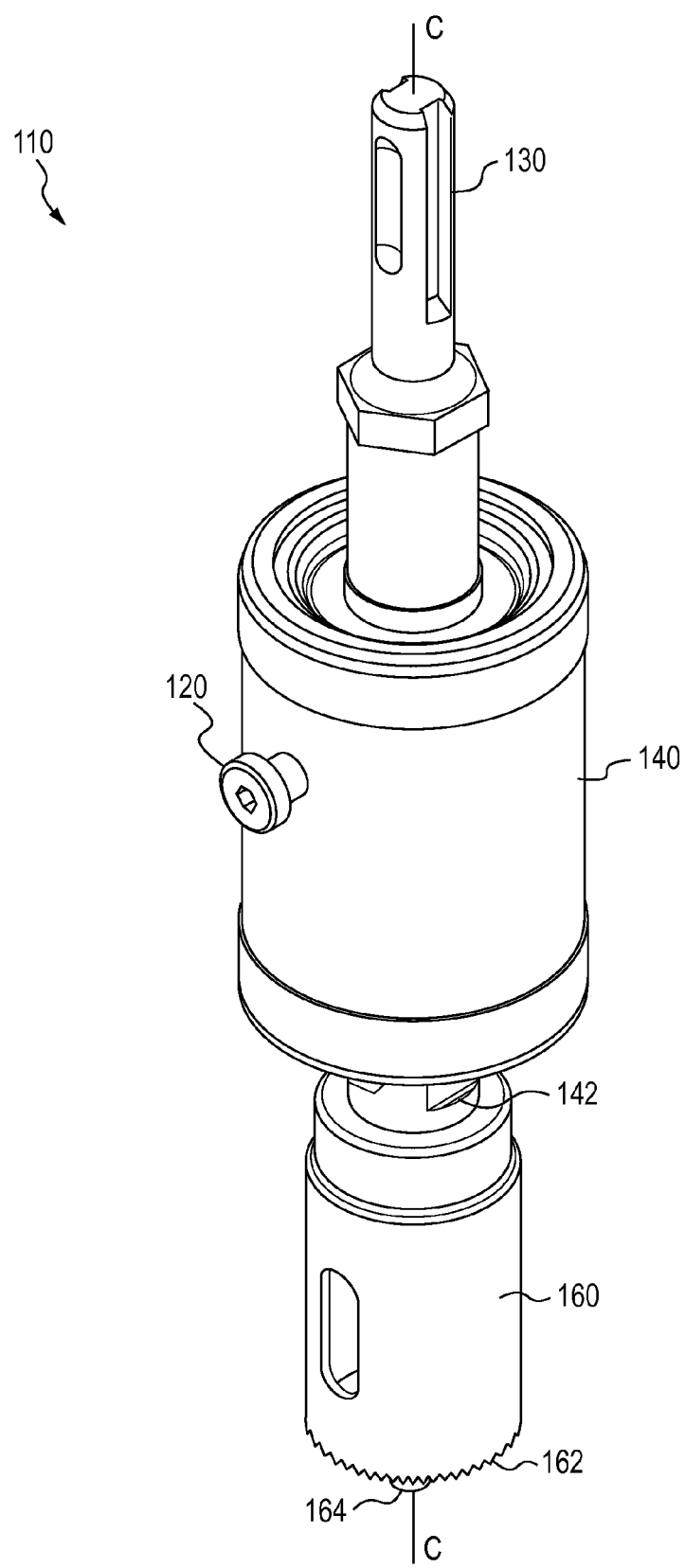
FIG. 5 is a schematic perspective view of an arbor shaft assembly of the hole saw drill guide of FIG. 1.

FIG. 5 is a perspective view of the arbor shaft assembly 110 of the hole saw drill guide 1. The arbor shaft assembly 110 includes the power drill connection member 130, the bearing carriage 140, the central shaft 142, and the hole saw 160 generally extending along a shared longitudinal axis. The arbor shaft assembly 110 includes the anti-rotation guide pin 120 projecting outward from the bearing carriage 140 and typically extending laterally outward and perpendicular to the axis C. It will be understood that the hole saw 160 can typically be detached from the central shaft 142. Depending upon the size of the hole or aperture to be formed, a user can attach a hole saw 160 having a desired size. As previously noted, the hole saw 160 defines a plurality of cutting teeth 162 along its edge. And, the hole saw 160 includes a pilot or centering drill 164. In certain versions, the power drill connection member 130 is removable. This feature enables the use of different connection members 130 such as those having different cross sectional shapes and/or lengths. For example, in certain applications it may be desirable to use a connection member 130 having a hexagon cross sectional shape.

Figure 6:
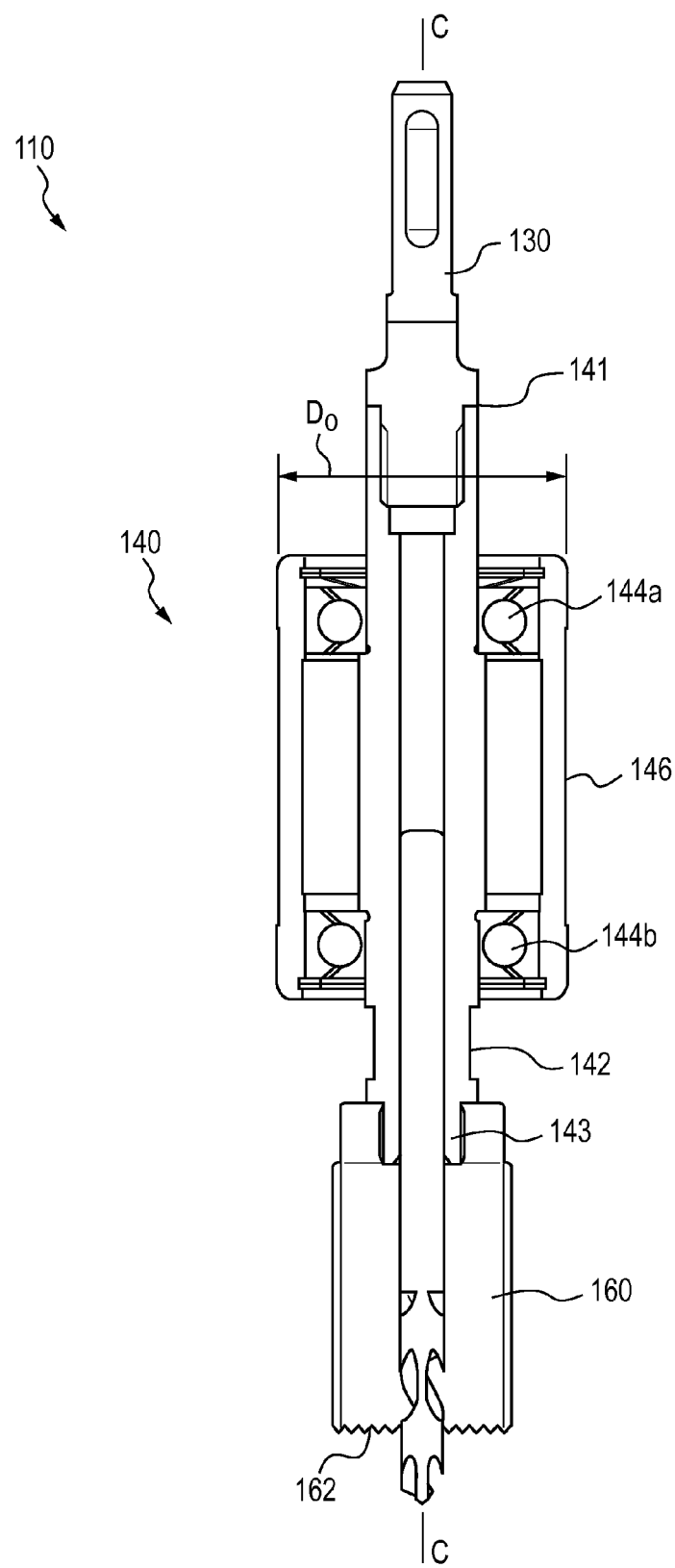
FIG. 6 is a schematic cross section of the arbor shaft assembly.

FIG. 6 is a cross sectional view of the arbor shaft assembly 110. The bearing carriage 140 includes the central shaft member 142, an outer housing 146, and a plurality of bearings disposed therebetween. In many embodiments, the bearings include a proximal bearing assembly 144a and a distal bearing assembly 144b. As will be appreciated, the central shaft member 142 can be freely rotated about the axis C while the outer housing 146 is stationary. The central shaft member 142 defines a proximal end 141 at which is engaged the power drill connection member 130, and an opposite distal end 143 at which the hole saw 160 can be selectively attached or engaged. Again, as previously noted, the drill connection member 130 can be removable so that the arbor shaft assembly 110 can utilize a variety of different drill connection members.

Referring to FIGS. 2-6, the engagement between the guide tube base assembly 10 and the arbor shaft assembly 110 is as follows. The outer diameter of the outer bearing housing 146 is such that the arbor shaft assembly 110 can be slidably inserted within the hollow interior 34 of the guide tube 30. Specifically, the outer diameter of the outer bearing housing 146 shown as diameter $D_O$ in FIG. 6 is less than and in many embodiments slightly smaller than the inner diameter $D_I$ defined by the inner surface 32 of the guide tube 30 and shown in FIG. 4 as $D_I$. Upon inserting the arbor shaft assembly 110 within the guide tube 30, the anti-rotation guide pin 120 is received by and inserted within the slot 20 defined in the guide tube 30. Additionally, upon insertion of the arbor shaft assembly 110 within the guide tube 30, the longitudinal axis C of the arbor shaft assembly 110 coincides and is aligned with the longitudinal axis B of the guide tube 30. Thus, upon rotation of the connection member 130 such as by engagement with a powered drill for example, rotation of the central shaft member 142 and the hole saw 160 occurs. The outer housing 146 is coupled to the stationary guide tube 30 via the guide pin 120 disposed within the slot 20. The bearings rotationally isolate the central shaft member 142 from the stationary outer housing 146, yet provide stability and maintenance of the longitudinal axis C coinciding with the longitudinal axis B of the guide tube assembly. In many embodiments, the guide tube and base are configured to provide a "stop" which limits travel of the arbor shaft assembly within the guide tube. The stop or other travel limiting provisions prevent drilling a hole through the opposite side of the pipe wall.

The present subject matter includes a wide array of provisions and means for rotatably securing the arbor shaft assembly within the guide tube and/or the guide tube base assembly. For example the anti-rotation guide pin 120 could be replaced with a machine feature, the slot 20 in the guide tube 30 could be replaced with a slot or other provision in the base 50, and/or the guide tube 30 could include an outwardly projecting pin.

In many embodiments the mounting base 50 and the chain adjustment provisions 40 are configured such that upon positioning and tightening the chain about a pipe or workpiece, the chain extends directly under the location at which a hole or aperture is to be created. This configuration in which the longitudinal axis C of the arbor shaft assembly 10 including the hole saw 160 intersects or is relatively close to a portion of the chain extending about the pipe outer surface, promotes stability of the hole saw drill guide 1 during its use.

Figure 7:
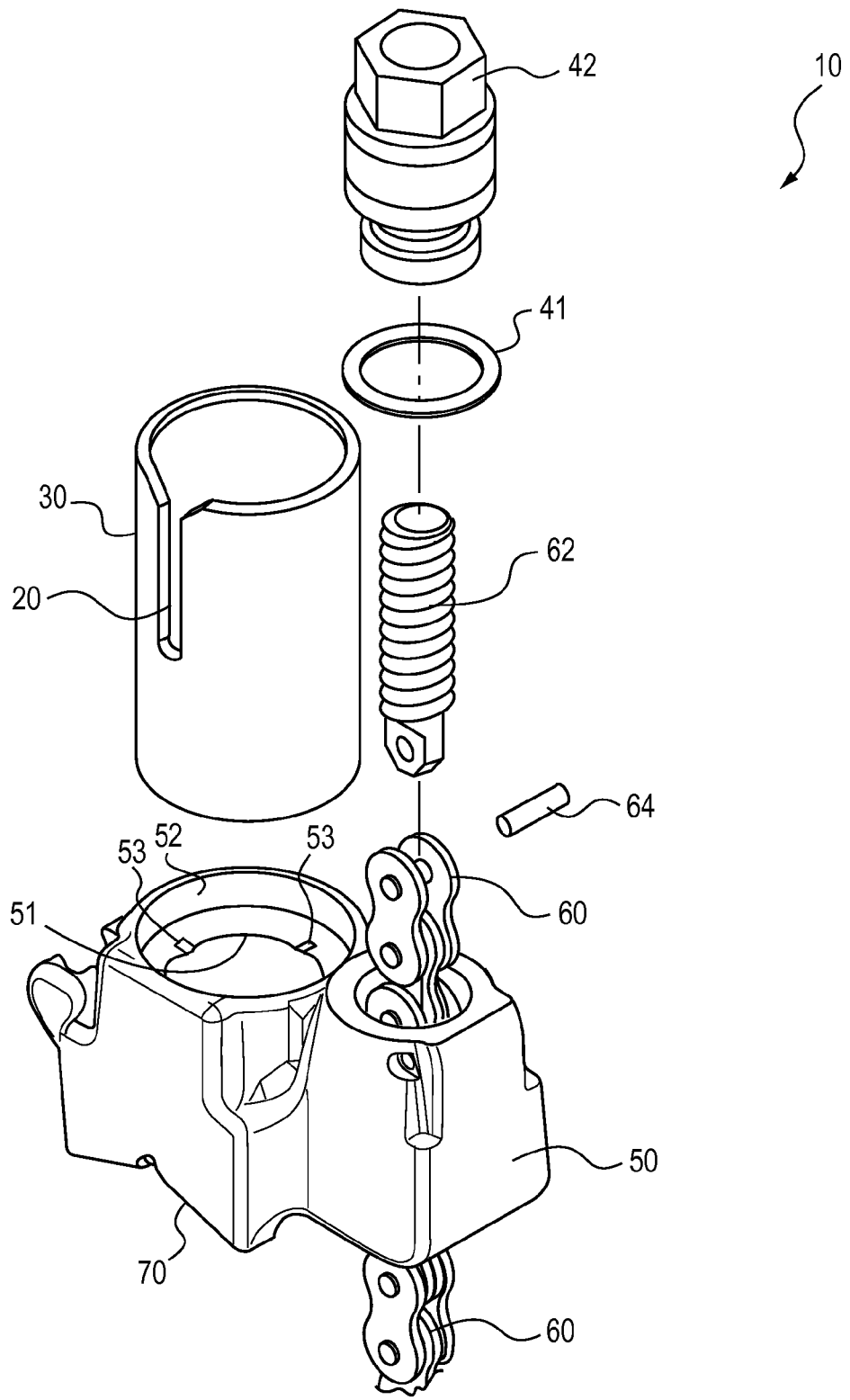
FIG. 7 is an exploded schematic view of the guide tube base assembly.

FIG. 7 is a schematic exploded view of the guide tube base assembly 10 and its components. The chain 60 can be engaged with the chain engagement member 62 by one or more pins 64. A bearing ring or thrust washer 41 can be used to rotatably position the nut 42 within the mounting base 50. That is, the nut 42 can rotate, typically against the bearing ring 42. In certain embodiments, the mounting base 50 can include one or more alignment sites 53 which promote positioning of the base 50 onto a pipe or tube (not shown). The alignment sites 53 can also assist in positioning the mounting base 50 relative to markings or a location for drilling on a pipe or other workpiece. Although the alignment sites 53 are shown as located near the mounting location of the guide tube 30, they can be located elsewhere on the mounting base 50 or on other components or regions of the hole saw drill guide 1. The mounting base 50 also defines an upper access region 51 which enables viewing of, and drilling access to, a pipe or workpiece below. Accordingly, one or more regions of the underside 70 of the base 50 are typically provided with openings to enable viewing and drilling of a pipe or workpiece.

Figure 8:
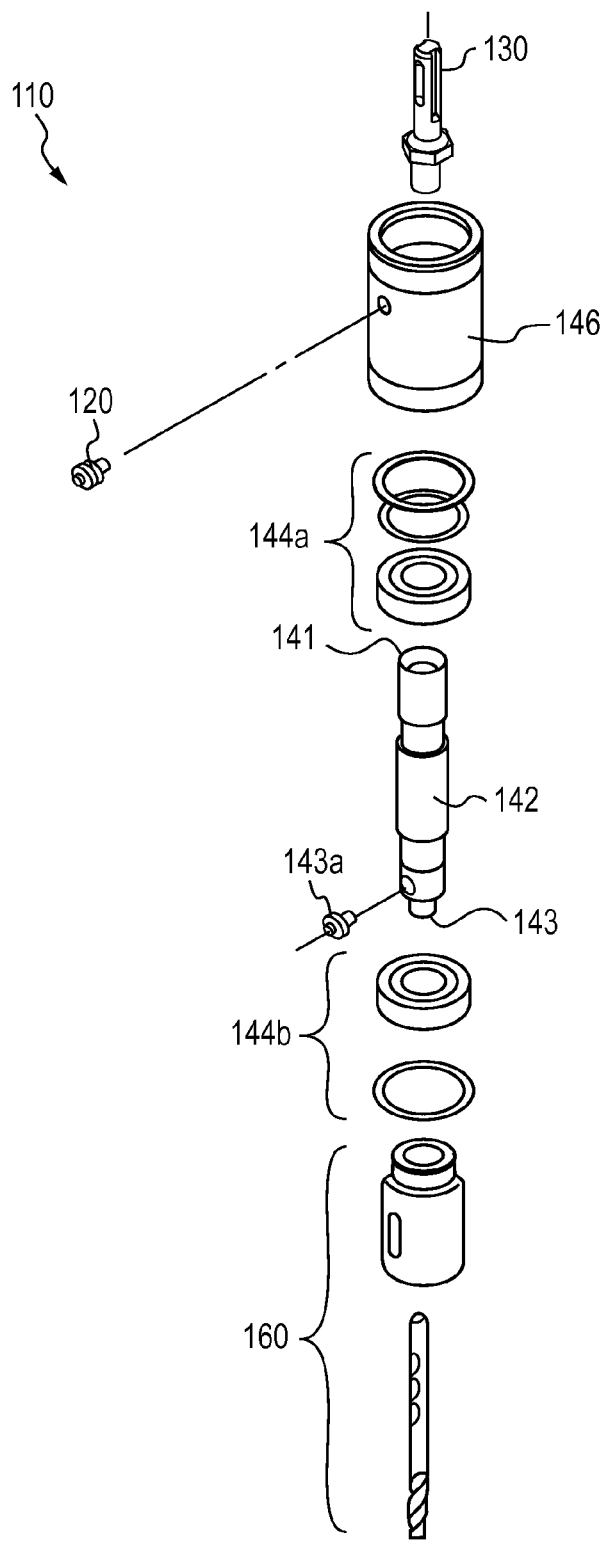
FIG. 8 is an exploded schematic view of the arbor shaft assembly.

FIG. 8 is a schematic exploded view of the arbor shaft assembly 110. The arbor shaft assembly 110 includes the previously noted central shaft member 142 rotatably supported within the outer bearing housing 146 by bearing assemblies 144a and 144b. The anti-rotation guide pin 120 is mounted in or otherwise engaged with the outer bearing housing 146. A retaining screw 143a can be used to facilitate replacement and use of different hole saws 160.

The hole saw drill guide 1 is used to create one or more holes, apertures or openings in workpieces such as pipes, and particularly through pipe walls. After identifying the location at which an aperture is to be formed in a pipe of interest, the guide tube base assembly, i.e., assembly 10 in the referenced figures, is positioned over the location. As a result of the V-shaped configuration of the underside of the mounting base, upon contact with the pipe the guide tube base assembly will be initially aligned with the desired location, so the user merely slides the guide tube base assembly along the length of the pipe if necessary, to fully align the guide tube base assembly with the desired location for aperture forming on the pipe. Alignment sites such as previously noted sites 53 can be used to assist in positioning and/or aligning the guide tube base on the pipe.

Once appropriately positioned on the pipe, the guide tube assembly is secured to the pipe. Securement can be performed by wrapping or positioning the chain attached at one end to the base, at least partially around the pipe and then pulling to remove slack, and attaching the chain end to the base. This can be performed by placing a chain pin (not shown) into a cradle 55 provided in the base 50. The chain adjustment provisions are then used to tension the chain about the pipe and thereby secure the guide tube base assembly to the pipe.

The arbor assembly having a hole saw engaged therewith is then inserted into the guide tube of the guide tube base assembly. The center of the hole saw, i.e., coinciding with the axis of rotation should also coincide with the desired location for the hole formation on the pipe. During insertion, the guide pin, i.e., guide pin 120 shown in the referenced figures, is received within the slot in the guide tube. As will be understood, the guide tube provides support and maintains alignment of the arbor shaft assembly and the hole saw relative to the guide tube assembly and the pipe.

Upon powered rotation of the central shaft of the arbor shaft assembly and thus of the hole saw, linear displacement of the rotating shaft and hole saw can occur as a result of the engagement between the guide pin and the slot. Thus, as the hole saw is linearly displaced through the pipe wall, the arbor shaft assembly is still laterally supported and its alignment maintained.

Although the present subject matter and particularly the guide tube base assembly has been described as including a chain and chain adjustment provisions, it will be appreciated that the present subject matter includes devices using an array of securement provisions besides and/or in addition to chains for securing the guide tube base assembly to a pipe or other workpiece, such as for example a strap.

The various embodiments of the present subject matter have been described in association with creating holes or apertures in pipes or tubes. However, it will be appreciated that the present subject matter devices can be used with other workpieces and is not limited to pipes.

The present subject matter provides numerous advantages and benefits. A wide range of hole saws having different diameter can be used with a single arbor shaft/guide assembly. Use of the hole saw drill guide provides accurate and precise positioning and guidance of the arbor shaft assembly. This enables holes to be formed perpendicular to a longitudinal axis of a pipe or tube. The anti-rotation guide pin engages with the slot in the guide tube to allow for linear motion of the arbor bearing carriage while preventing rotation of the outer housing of the bearing carriage. The guide tube and the chain mounting base can be aligned with an axis of a hole to improve stability of the device. Vacuum connection enables convenience removal of drilling debris. Alignment marks on the base of the guide tube facilitate positioning the guide tube base assembly to hole locating marks on a pipe or tube. And, various exchangeable connections allow the use of different and various drills.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A hole saw drill guide comprising: a guide tube base assembly including a guide tube defining a distal edge, a hollow interior and a linear slot extending from the distal edge along at least a portion of the length of the guide tube; an arbor shaft assembly including a central shaft, an outer housing, a plurality of bearings for rotatably supporting the central shaft within the outer housing, and an outwardly projecting guide pin engaged with the outer housing; wherein the arbor shaft assembly is sized to be insertably received within the hollow interior of the guide tube and upon positioning the guide pin of the arbor shaft assembly within the slot defined by the guide tube, the central shaft of the arbor shaft assembly is rotatably supported within the guide tube of the guide tube base assembly while allowing linear displacement of the entire arbor shaft assembly relative to the guide tube base assembly, thereby coupling the outer housing of the arbor shaft assembly to the guide tube of the guide tube base assembly.

2. The hole saw drill guide of claim 1 wherein upon positioning the guide pin of the arbor shaft assembly within the slot defined by the guide tube, the axis of rotation of the central shaft of the arbor shaft assembly coincides and is aligned with the longitudinal axis of the guide tube.

3. The hole saw drill guide of claim 1 wherein the guide tube base assembly further includes securing provisions for releasably securing the guide tube base assembly to a workpiece.

4. The hole saw drill guide of claim 3 wherein the securing provisions include a chain releasably affixed to the guide tube base assembly and chain adjustment provisions.

5. The hole saw drill guide of claim 3 wherein the securing provisions include a strap for releasably affixing the guide tube base assembly to the workpiece.

6. The hole saw drill guide of claim 1 wherein the guide tube base assembly further includes a mounting base that defines a hollow interior, the guide tube secured to the mounting base.

7. The hole saw drill guide of claim 6 wherein the guide tube base assembly further includes a vacuum port in communication with the hollow interior defined by the mounting base.

8. The hole saw drill guide of claim 6 wherein the mounting base defines an underside having a V-shaped configuration.

9. The hole saw drill guide of claim 1 wherein the central shaft defines a proximal end and an opposite distal end, the arbor shaft assembly further including a power drill connection at the proximal end of the central shaft.

10. The hole saw drill guide of claim 9, the arbor shaft assembly further includes a hole saw engaged at the distal end of the central shaft.

11. The hole saw drill guide of claim 10 wherein the hole saw is releasably engaged at the distal end of the central shaft.

12. The hole saw drill guide of claim 11 wherein the hole saw includes a pilot drill.

13. The hole saw drill guide of claim 9 wherein the power drill connection is removably engageable with the central shaft.

14. The hole saw drill guide of claim 1 wherein the plurality of bearings include a proximal bearing assembly and a distal bearing assembly, each disposed between the central shaft and the outer housing.

15. A hole saw drill guide comprising:
a guide tube base assembly including a mounting base, a guide tube extending from the mounting base and defining a distal edge, a longitudinal axis, and endwall, a hollow interior and slot extending between the distal edge and the endwall along at least a portion of the length of the guide tube, the slot being parallel with the longitudinal axis;
an arbor shaft assembly including a central shaft, an outer housing, a plurality of bearings for rotatably supporting the central shaft within the outer housing, and an outwardly projecting guide pin engaged with the outer housing;
wherein the arbor shaft assembly is sized to be insertably received within the hollow interior of the guide tube and upon positioning the guide pin of the arbor shaft assembly within the slot defined by the guide tube, the central shaft of the arbor shaft assembly is rotatably supported within the guide tube of the guide tube base assembly,
wherein the mounting base includes chain adjustment provisions that include a chain and an adjustment nut, such that rotation of the adjustment nut results in linear displacement of the chain to either lengthen or shorten the length of the chain and upon positioning and tightening the chain about a pipe or workpiece, the chain extends directly under a location at which a hole or aperture is to be formed.

16. The hole saw drill guide of claim 15 wherein upon positioning the guide pin of the arbor shaft assembly within the slot defined by the guide tube, the axis of rotation of the central shaft of the arbor shaft assembly coincides and is aligned with the longitudinal axis of the guide tube.

17. A hole saw drill guide comprising:
   a guide tube base assembly including a guide tube defining a hollow interior and an S-shaped slot extending along at least a portion of the length of the guide tube;
   an arbor shaft assembly including a central shaft, an outer housing, a plurality of bearings for rotatably supporting the central shaft within the outer housing, and an outwardly projecting guide pin engaged with the outer housing;
   wherein the arbor shaft assembly is sized to be insertably received within the hollow interior of the guide tube and upon positioning the guide pin of the arbor shaft assembly within the slot defined by the guide tube, the central shaft of the arbor shaft assembly is rotatably supported within the guide tube of the guide tube base assembly.

18. The hole saw drill guide of claim 17 wherein the S-shaped slot extends partially along the length of the guide tube.

19. The hole saw drill guide of claim 17 wherein the S-shaped slot extends along the entire length of the guide tube.

20. The hole saw drill guide of claim 17 wherein upon positioning the guide pin of the arbor shaft assembly within the slot defined by the guide tube, the axis of rotation of the central shaft of the arbor shaft assembly coincides and is aligned with the longitudinal axis of the guide tube.

21. A hole saw drill guide comprising:
   a guide tube base assembly including a guide tube defining a distal edge, a hollow interior, a linear slot extending from the distal edge along at least a portion of the length of the guide tube, and at least one slot shoulder between the distal edge and the slot;
   an arbor shaft assembly including a central shaft, an outer housing, a plurality of bearings for rotatably supporting the central shaft within the outer housing, and an outwardly projecting guide pin engaged with the outer housing;
   wherein the arbor shaft assembly is sized to be insertably received within the hollow interior of the guide tube and upon positioning the guide pin of the arbor shaft assembly within the slot defined by the guide tube, the central shaft of the arbor shaft assembly is rotatably supported within the guide tube of the guide tube base assembly, thereby coupling the outer housing of the arbor shaft assembly to the guide tube of the guide tube base assembly.

* * * * *